Figure 1:
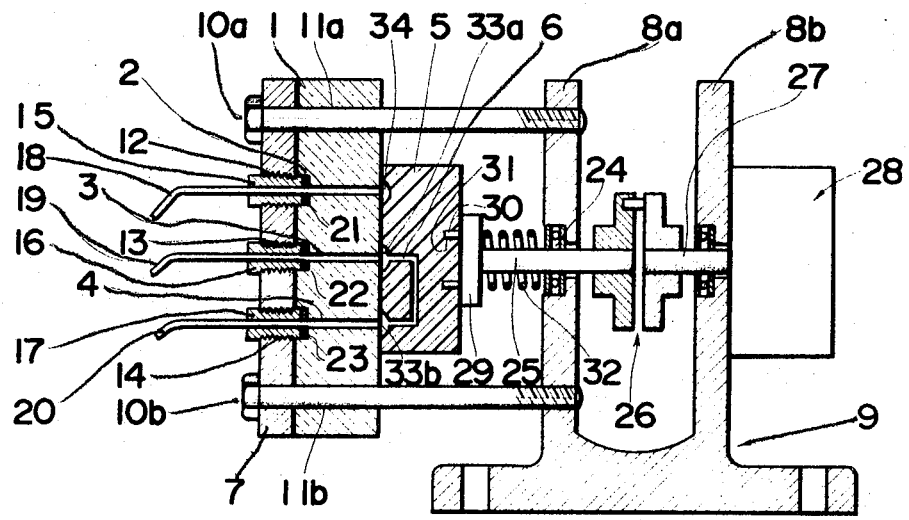

United States Patent [19]
Makabe

[11] 3,752,167
[45] Aug. 14, 1973

[54] FLUID SWITCHING DEVICE

[75] Inventor: Hideki Makabe, Nakakyo-ku, Kyoto, Japan

[73] Assignee: Shimadza Seisakusho Ltd., Kyoto, Japan

[22] Filed: June 30, 1971

[21] Appl. No.: 158,227

[30] Foreign Application Priority Data
July 7, 1970 Japan................................. 45/59688
July 28, 1970 Japan................................. 45/65998

[52] U.S. Cl.............................. 137/609, 137/625.41
[51] Int. Cl............................................. F16k 11/14
[58] Field of Search................... 137/625.41, 625.47, 137/625.42, 609; 251/309, 310, 81

[56] References Cited
UNITED STATES PATENTS

| | | | |
|---|---|---|---|
| 3,148,703 | 9/1964 | Kachline | 137/608 |
| 3,476,150 | 11/1969 | Loewenthal | 137/608 X |
| 2,893,429 | 7/1959 | Schaffer | 137/625.41 |
| 3,375,849 | 4/1968 | Swartz | 137/625.41 X |
| 3,490,736 | 1/1970 | Snyder | 251/309 X |
| 3,503,415 | 3/1970 | DeAngelis et al. | 137/375 |
| 3,395,890 | 8/1968 | Eckert et al. | 251/368 X |
| 3,011,754 | 12/1961 | Ander | 251/81 |
| R24,055 | 8/1955 | Daniels | 137/625.41 X |
| 3,011,721 | 12/1961 | Wiltz | 251/81 X |
| 3,614,061 | 10/1971 | Fitzpatrick | 251/368 X |
| 3,618,637 | 11/1971 | Santomieri | 137/625.41 |
| 3,630,232 | 12/1971 | Hasselrus | 137/625.41 |

*Primary Examiner*—Samuel Scott
*Attorney*—E. F. Wenderoth, Jeffrey Nolton et al.

[57] ABSTRACT

A rotary valve having a stationary member formed therein with a plurality of fluid passages and a rotary member formed therein with at least one channel adapted to communicate one of said fluid passages to another therethrough upon rotation of said rotary member. To facilitate a satisfactorily smooth rotation of said rotary member in contact with the stationary member, both the stationary member and the rotary member are made of materials of dissimilar quality having relatively higher and lower hardness, respectively, and, in addition thereto, the contact surfaces there of are polished very accurately.

9 Claims, 2 Drawing Figures

HIDEKI MAKABE,
INVENTOR

BY Wendroth Lind & Ponack
ATTORNEYs

FLUID SWITCHING DEVICE

The present invention relates to a fluid switching device and, more particularly, to an improved rotary valve comprising a stationary member formed with a plurality of fluid passages therein and a rotary member formed with at least one channel adapted to selectively connect one of said passage to another upon rotation of said rotary member.

A rotary valve adaptable for successively supplying fluid medium from a single fluid source or a plurality of fluid sources respectively to a plurality of destinations or a single destination has been well known. Such device may comprise a stator formed on one surface thereof with a plurality of recesses with a corresponding number of fluid passages extending across the thickness of said stator member respectively in alignment with said recesses in such a manner that, while one end of each of said fluid passages is connected with the fluid source or destination, the other ends are open to the depth of the corresponding recess. A corresponding number of O-shaped seal rings accommodated in said recesses, and a rotor having one surface in engagement with said surface of said stator through said rings and formed therein with at least one channel through which the fluid medium supplied from one of said passages in said stator can be in turn supplied to any other one of said passages upon rotation of said rotor by means of the corresponding seal rings. In the rotary valve of the type above referred to, the opening of one of said passages on one surface of said stator is generally in register with the opening of one end of said channel in said rotor which is positioned in alignment with the axis of rotation of said rotor, the opening of the other end of said channel being positioned so as to be, as the rotor is rotated, brought into register with each opening of the remaining passages.

This type of rotary valve has been extensively employed in pharmaceutical synthesizing instruments, for example, an automated peptide synthesizer. As is well known by a chemical engineer, the automated peptide synthesizer is designed such that various amino acids are supplied to a reactor from which peptide can be obtained. In this case, in order to supply the amino acids to the reactor one after another, the rotary valve of the type above referred to is generally employed to effect the switching of the fluid path under the instruction of an electric or electronic programmer adapted to control the application of current to an electrical motor for operating the rotary valve. In any event, some chemicals such as amino acids are corrosive and/or valuable so that these chemicals should be carefully handled. Accordingly, the rotary valve of the type above referred to must have a sufficient resistance to corrosion and must be constructed such that valuable chemicals may not be spoiled. In addition, since the opposite surfaces of the stator and the rotor are not only ordinarily polished, but also these opposite surfaces are not directly contacted to each other while the respective seal rings act as bridging members for connecting the passages in the stator and the channel in the rotor, there has often occurred a leakage of fluid medium flowing between the passage and the channel. This is because, in view of the fact that the rotor is usually made of fluorocarbon resin and is strongly urged by an elastic member, such as a compression spring, toward the stator, portions of the surface of said rotor in contact with the seal rings are often worn off under friction caused upon rotation of the rotor relative to the stator during a long period of use to an extent that a gap is formed between the seal rings and the open ends of the channel.

Once the leakage of fluid medium occurs as hereinbefore described, the contacted opposite surfaces of the stator and the rotor are wetted by the leaking fluid medium so that dust in the air often sticks thereto, resulting in that the fluid medium employed is contaminated by such dust.

Accordingly, an essential object of the present invention is to provide an improved rotary valve of the type above referred to capable of smoothly switching the fluid path, which has a sufficient resistance to corrosion as well as a satisfactory durability.

Another object of the present invention is to provide an improved rotary valve of the type above referred to comprising a stationary member, preferably made of solid material having a relatively higher hardness and a sufficient resistance to corrosion, and a rotary member preferably made of solid material having a relatively lower hardness and a sufficient resistance to corrosion, whereby rotation of the rotary member in contact with the stationary member can be smoothly performed with substantial reduction of scraping of the material employed for the both members which will otherwise contaminate a valuable fluid medium adapted to be supplied therethrough.

A further object of the present invention is to provide an improved rotary valve of the type above referred to an improved rotary valve of the type above referred to wherein one surface of the rotary member is air-tightly contacted with the adjacent surface of the stationary member so that not only liquid medium, but also gaseous medium can be advantageously suppled therethrough without substantial leakage thereof.

A still further object of the present invention is to provide an improved rotary valve of the type above referred to which is simplified in structure and appreciably low in manufacturing cost and can be simply and easily incorporated into or assembled to any instruments which necessitate such a type of rotary valve.

According to the present invention, material for the stationary member which has a sufficient resistance to corrosion as well as a relatively higher hardness may be hard glass such as known as "Pyrex" (Reg. Trademark owned by Corning Glass Works) or glass ceramic such as known as "Pyroceram" (Reg. Trademark owned by Corning Glass Works), while material for the rotary member which has a sufficient resistance to corrosion as well as a relatively lower hardness may be any one of fluorocarbon polymers including polytetrafluoroethylene, polychlorotrifluoroethylene, copolymer of tetrafluoroethylene and hexafluoroethylene, polyvinylidene, polyvinylfuoride and the like or any one of the above fluorocarbon polymers each of which is mixed with glass fiber.

Alternatively, the above mentioned material for the stationary member may be employed for the rotary member while that for the rotary member may be employed for the stationary member, without any reduction in the durability of the rotary valve of the present invention.

Figure 2:
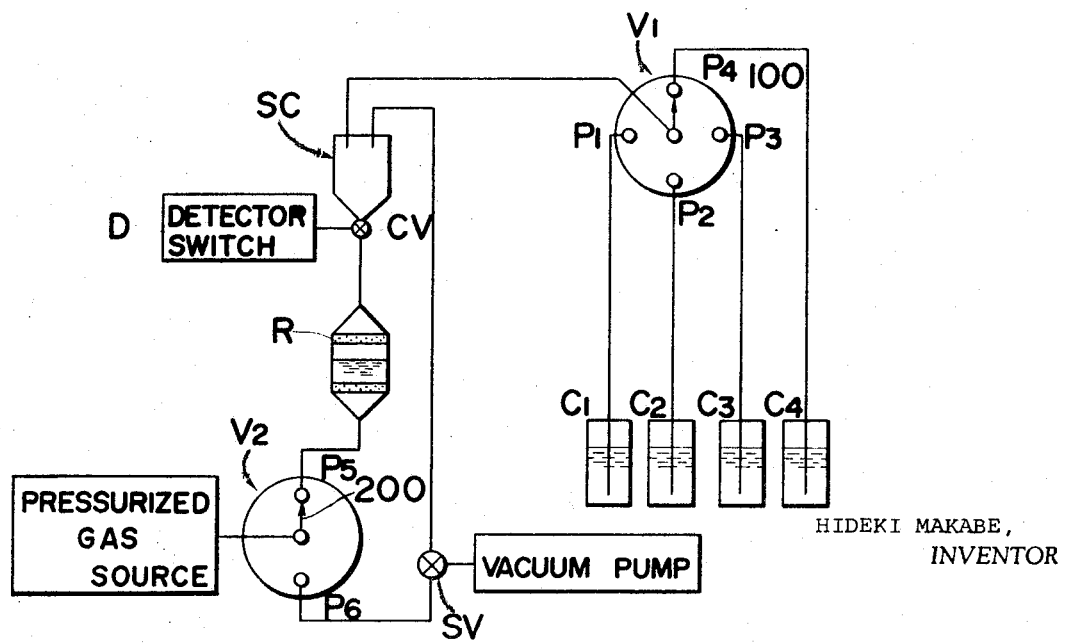

These and other objects and features of the present invention will be apparent from the following description taken in conjunction with a preferred embodiment of the present invention with reference to the accompanying drawings, in which;

FIG. 1 is a longitudinal sectional view of a rotary valve constructed in accordance with the teachings of the present invention and FIG. 2 is a schematic circuit diagram used to explain the operation of the rotary valve according to the present invention.

Referring now to FIG. 1, the fluid switching device or rotary valve constructed in accordance with the teachings of the present invention generally comprises a stationary member 1, made of glass material as hereinbefore recited and formed therein with a plurality of fluid passages extending across the thickness of said stationary member 1, only three of which being shown at 2, 3 and 4, and a rotary member 5 made of synthetic resin as hereinbefore recited and formed therein with a channel 6. The both members 1 and 5 are disposed in a spacing defined between a back-up plate 7, preferably made of stainless steel, and one vertical stand 8a of a valve supporter structure which is generally indicated by 9. Both said back-up plate 7 and said vertical stand 8a are connected to each other by means of a plurality of bolts, two of which being shown at 10a and 10b. All of these bolts 10a and 10b extend through respective through-holes 11a and 11b, formed in the stationary member 1, of the diameter substantially equal to that of each bolt 10a or 10b, so that said stationary member 1 can be steadily supported in that spacing.

The back-up plate 7 is formed with a plurality of threaded holes 12, 13 and 14 across the thickness thereof in coaxial relation with the respective fluid passages 2, 3 and 4 in the stationary member 1. These threaded holes 12, 13 and 14 are adapted to rigidly receive respective couplings 15, 16 and 17 undetachably connected with flexible tubings 18, 19 and 20, each of said tubings being preferably made of material having a sufficient resistance to corrosion and having the inner surface smoothed to ensure the flow of fluid therethrough without receiving any resistance.

In the stationary member 1, each of the passages 2, 3 and 4 has one end opened on the right-hand surface and the other end enlarged on the left-hand surface to provide a diameter substantially equal to the outer diameter of the tip portion of each of said couplings 15, 16 and 17. In the assembled condition as shown, the tip portions of said couplings 15, 16 and 17 are all projected beyond the back-up plate 7 and tightly engaged in the respective enlarged openings of said passages 2, 3 and 4 through corresponding sealing members 21, 22 and 23 interposed therebetween.

Extending through a bearing hole 24 formed in the vertical stand 8a of the valve supporter structure 9 is a connecting rod 25 having one end connected with a clutch 26 which is in turn connected with a drive shaft 27 of an electric motor 28 supported by another vertical stand 8b of the structure 9, and the other end rigidly connected with the adjacent surface of an abutment 29 of which the opposite surface is formed with a plurality of pins 30 engageable in recesses 31 formed on the right-hand surface of the rotary member 5. Disposed around the connecting rod 25 betwen the vertical stand 8a and the abutment 29 is a compression spring 32 adapted to urge the stationary member 1 and the rotary member 5 toward the back-up plate 7, the value of force exerted by said compression spring 32 being such that the air-tight contact between the back-up plate 7 and the stationary member 1 and between the stationary member 1 and the rotary member 5 can be respectively ensured. In addition, even through the force exerted by the compression spring 32 is relatively greater, a satisfactorily smooth rotation of the rotary member 5 while the left-hand surface or contact surface of said member 5 is tightly contacted to the adjacent surface of the stationary member 1 which acts as a valve seat can be advantageously ensured by the reason as hereinafter described.

The thickness of each of the stationary member 1 and the rotary member 5 may not be uniform a given points thereof. However, especially the right-hand surface or valve seat of the stationary member 1 and the contact surface of the rotary member 5 adapted to tightly contact said valve seat of said stationay member 1 must be finished flat very accurately. To this end, a conventional optical polishing method can be employed. However, according to the present invention, each of the relevant surfaces of the stationary member 1 and the rotary member 5 is polished by the use of an optical flat to an extent that the thickness of the very thin layer of air between the two surfaces (i.e., the bottom of the flat and the top of the surface to be tested) measures one half a wavelength of light employed. Accordingly, it will be clearly understood that, partly because hard glass or glass ceramic or one of the fluorocarbon polymers with or without glass fiber are employed the material of the stationary and rotary members 1 and 5, respectively, and vice versa, and partly because the valve seat of the stationary member 1 and the contact surface of the rotary member 5 are respectively polished very accurately, the satisfactorily smooth rotation of the rotary member 5 can be advantageously ensured without necessitating any lubricant which may, if employed in a contact area between the valve seat of the stationary member 1 and the contact surface of the rotary member 5, contaminate a valuable fluid medium supplied therethrough. In addition, since the stationary member 1 and the rotary member 5 are respectively made of dissimilar material, i.e., hard material for the former and soft material for the latter in the instance as shown, the whole contact surface of said rotary member 5 can be advantageously tightly contacted to the corresponding area of the valve seat of said stationary member 1 with the urging force of comparatively smaller value exerted by the compression spring 32.

In the arrangement as shown and hereinbefore described, it is to be noted that the opening of one of the fluid passages, for example, that of the passage 3 must be essentially positioned on the valve seat of the stationary member 1 in register with the open end of the channel 6, while each opening of the remaining passages 2 and 4 formed on said valve seat is spaced a distance of the value substantially equal to the distance between said one open end of the channel 6 to the other open end of said channel 6, said both open ends of said channel 6 being formed on the same plane, that is, the contact surface of the rotary member 5.

Each end of the channel 6 and a portion of the contact surface of the rotary member 5 which is in register with either of the passages 2 and 4 are preferably recessed as shown by 33a and 33b and 34, respectively, to an extent that the diameter of the opening of each recess 33a, 33b or 34 is slightly larger than that of each passages 2, 3 or 4. This is because the synthetic resin employed as material for the rotary member 5 generally has a creeping character in which portions of the rotary member 5 may creep in any one of the passages 2, 3 and 4 so long as the rotary member is pressed to the stationary member 1 by means of the compression spring 32. Once this creeping occurs, not only the smooth rotation of the rotary member 5 is disturbed, but also creeping portion of the synthetic resin or rotary member which are respectively situated in the adjacent open ends of the passages 2, 3 and 4 will be cut off into the fluid medium flowing therethrough upon rotation of the rotary member 5. Yet, it may occur that the tight contact between the valve seat of the stationary member will be destroyed upon rotation of the rotary member 5 with the result of leakage of the fluid medium therefrom to the outside of the valve arrangement. However, elimination of this defect as hereinbefore described is advantageously ensured in the rotary valve of the present invention. In any event, if leakage of the fluid medium occurs, the leaking portion of the fluid medium will be evaporated in contact with the atmospheric air since, according to the present invention, the outer extremity of the contact area between the valve seat of the stationary member 1 and the contact surface of the rotary member 5 is exposed to the atmosphere.

From the foregoing description, it will be clearly understood by those skilled in the art that, if the tubing 19 is connected from a fluid source, the fluid medium present in the tubing 19 can be supplied to either of the passages 2 and 4 through the channel 6 upon rotation of the rotary member 5. In the instance as shown, the passage 3 connected with the tubing 19 is in position to communicate with the passage 4 through the channel 6. However, if the rotary member 5 is rotated, for example, through 180°, this passage 3 can be communicated with the remaining passage 2 which is positioned 180° apart with respect to the passage 3 or the axis of rotation of the rotary member 5.

The rotary valve arrangement constructed as hereinbefore described in accordance with the teachings of the present invention can be utilized in a manner as shown in FIG. 2 wherein two rotary values are provided as indicated by $V_1$ and $V_2$.

Referring now to FIG. 2, one of the rotary valves $V_1$ has the stationary member provided therein with four passages $P_1$, $P_2$, $P_3$ and $P_4$ respectively connected with solution containers $C_1$, $C_2$, $C_3$ and $C_4$ and the rotary member provided therein with a single channel 100 of which one open end in alignment with the axis of rotation of the rotary member is connected with a suction container SC as will be mentioned later. The other rotary valve $V_2$ has the stationary member provided therein with two passages $P_5$ and $P_6$ and the rotary member provided therein with a single channel 200 of which one open end in alignment with the axis of rotation of the rotary member is connected with a pressurized gas source from which preferably an inertia gas under pressure can be supplied.

The passage $P_5$ of the rotary valve $V_2$ is connected with the suction container SC through a reactor such as employed in an automatic peptide synthesizer and then through a cut-off valve CV while the other passage $P_6$ is connected with the suction container SC through a switching valve SV which is in shunt connected with a vacuum pump of the conventional type.

The cut-off valve CV and the switching valve SV are electrically associated with each other and operable by the signal applied from a detector switch D in such a manner that, when the cut-off valve is in the closed position, the switching valve SV is in position to establish the communication between the passage $P_6$ to the suction container SC, and vice versa. The detector switch D is adapted to be operated in response to the level of fluid medium contained in the suction container SC.

In the arrangement as hereinbefore described, if the valve $V_1$ is in position as shown in FIG. 2 and the suction container SC is empty (therefore, the switching valve SV is in position to establish the communication between the suction container SC and the vacuum pump), the pressure within the suction container SC can be reduced so that solution contained in the container $C_4$ can be sucked into said container SC through the valve $V_1$. When the level of the solution thus sucked into the container SC reaches at a predetermined value, the detector switch D operates so as to bring the switching valve SV into the position in which the communication between the passage $P_6$ and there is suction container SC thereby to cease the supply of the solution from the container $C_4$ into the container SC and subsequently bring the cut-off valve CV into the open position thereby to permit the flow of a predetermined amount of solution into the reactor under its own gravity. If at this time the passage $P_5$ of the valve $V_2$ is communicated with the pressurized gas source as shown, a gaseous body can be supplied to the reactor R thereby to effect the agitation to the solution contained in the reactor R.

After a lapse of a certain time, the rotary member of the valve $V_2$ is rotated through 180° to establish the communication between the pressurized gas source and the suction container SC through the valve SV which is at this time in position to communicate between the passage $P_6$ and the suction container SC and, therefore, a gaseous body can be supplied to the solution container $C_4$ through the rotary valve $V_1$ whereby residual of the solution present in the passage between the container SC and the valve $V_1$, the channel 100 of the valve $V_1$ and the passage $P_4$ can be cleared off back to the solution container $C_4$. Thereafter, the switching valve SV is switched to the position in which the communication between the vacuum pump and the suction container SC can be established. About the same time, the rotary member of the valve $V_1$ is rotated through 90° to establish the communication between the passage $P_3$ and the suction container SC. Thus, the similar operation as hereinbefore described can be repeated until the solution contained in the container $C_1$ can be supplied to the reactor R.

However, it is to be noted that, upon completion of the reaction of each solution in the reactor R, the reacted solution can be recovered from an outlet port (not shown) of the reactor R, manually or by means of an additional rotary valve which may be disposed between the reactor R and the valve $V_2$, the fluid circuit for this purpose being easily contemplated in any way.

Although the present invention has been fully described by way of example in conjunction with the preferred embodiment shown in the accompanying drawings, various modification and change are apparent to those skilled in the art. For example, the valve seat of the stationary member 1 and the contact surface of the rotary member 5 may be curved without any reduction of the performance of the valve arrangement of the present invention. In addition, in the case where it is desired to manually operate the valve arrangement of the present invention, the clutch 26, the motor 28 including its drive shaft 27 and the vertical stand 8b of the supporter structure 9 may be omitted and, instead, a knob can be rigidly mounted on the relevant end of the connecting rod 25. Furthermore, in lieu of the compression spring 32, any means for elastically urging the rotary member toward the stationary member and then the back-up plate through the stationary member can be employed.

What is claimed is:

1. A fluid switching device which comprises a stationary member rigidly carried by a framework and having a flat contact surface; a plurality of fluid passages independently formed in said stationary member and extending across the entire width of said stationary member, each of said fluid passages having an opening formed on said flat contact surface of said stationary member; a rotary member rotatably carried by the framework and having a flat contact surface slidably contacting said flat contact surface of said stationary member; at least one switching passage formed in said rotary member and having both openings thereof formed on said flat contact surface thereof, such that one of said fluid passages in said stationary member can be selectively connected with another one of said fluid passages in said stationary member through said switching passage upon rotation of said rotary member; either of said stationary and rotary members being formed of hard glass or glass ceramic material while the other member is formed of a fluorocarbon polymer material; resilient means disposed between said framework and a surface of said rotary member opposite to said contact surface thereof for urging said rotary member toward said stationary member and to cause said contact surface of said rotary member to tightly, but slidably, contact said contact surface of said stationary member; one of said fluid passages having an opening thereof situated in alignment with the axis of rotation of said rotary member; and the other fluid passages having the openings thereof formed on said contact surface of said stationary member spaced equidistantly with respect to said opening of said one of said fluid passages in a circular arrangement, the distance between said opening of said one of said fluid passages and any one of the openings of said other fluid passages being equal to the distance between said both openings of said switching passage formed in said rotary member.

2. A fluid switching device as claimed in claim 1, wherein the periphery of the contact area formed by said contact surfaces of said stationary and rotary members is exposed to the atmosphere.

3. A fluid switching device as claimed in claim 1, wherein said one of said fluid passages having an opening which is in alignment with the axis of rotation of said rotary member is connected with a pressurized gas source whereby, when said one of said passages is connected with any one of said remaining fluid passages through said switching passage, the residual of fluid medium present in said switching passage and said any one of said remaining fluid passages can be removed.

4. A fluid switching device as claimed in claim 1, wherein said fluid switching device is a switching valve in combination with a system for the preparation of synthetic peptide.

5. A fluid switching device as claimed in claim 1, wherein the ends of the openings, opening into the contact area between said contact surfaces of said member formed of a fluorocarbon polymer material are recessed.

6. A fluid switching device as claimed in claim 1, further comprising drive means including a connecting rod for rotating said rotary member and wherein said resilient member is a compression spring mounted round said connecting rod.

7. A fluid switching device as claimed in claim 13, wherein said connecting rod is provided at a substantially intermediate portion thereof with a clutch for selectively interrupting the transmission of a rotational force from said drive means to said rotary member.

8. A fluid switching device as claimed in claim 1, wherein said one of said fluid passages having an opening which is in alignment with the axis of rotation of said rotary member is connected with a chemical reaction bath and said other fluid passages are respectively connected with sources of chemical solutions of different composition.

9. A fluid switching device as claimed in claim 8, wherein said chemical solutions are chemical corrosive materials.

* * * * *